United States Patent
Lamoure

Patent Number: 5,745,177
Date of Patent: Apr. 28, 1998

[54] PICKUP DEVICE FOR READING PEN

[75] Inventor: Jacques Lamoure, Meudon, France

[73] Assignee: Cherloc S.A., La Roche-Sur-Yon, France

[21] Appl. No.: 523,310

[22] Filed: Sep. 5, 1995

[30] Foreign Application Priority Data

Sep. 6, 1994 [FR] France ................... 94 10641

[51] Int. Cl.⁶ ................... H04N 5/225
[52] U.S. Cl. ................... 348/373; 358/473
[58] Field of Search ........... 348/208, 373–376, 348/207, 335, 339–340, 343–344, 338, 341; 358/473, 474; 382/313, 315; 235/462, 472; 250/208.1

[56] References Cited

U.S. PATENT DOCUMENTS

| | | | |
|---|---|---|---|
| 3,541,248 | 11/1970 | Young | 358/473 |
| 4,626,925 | 12/1986 | Toyoda. | |
| 4,639,790 | 1/1987 | Kusaka | 358/497 |
| 4,739,159 | 4/1988 | Inokuchi | 348/340 |
| 4,800,444 | 1/1989 | Suzuki et al. | 358/473 |
| 4,906,843 | 3/1990 | Jones et al. | 250/221 |
| 5,121,226 | 6/1992 | Kubota et al. | 358/473 |
| 5,272,518 | 12/1993 | Vicent | 356/405 |
| 5,301,243 | 4/1994 | Olschafskie et al. | 358/473 |
| 5,365,605 | 11/1994 | Hosogoe et al. | 382/59 |
| 5,574,804 | 11/1996 | Olschafskie et al. | 358/473 |
| 5,648,650 | 7/1997 | Sugifune et al. | 235/472 |
| 5,654,533 | 8/1997 | Suzuki et al. | 235/455 |
| 5,663,552 | 9/1997 | Komizo | 235/472 |

OTHER PUBLICATIONS

Patent Abstracts of Japan, vol. 7, No. 38 (P–176) (1183) Feb. 16, 1983.

*Primary Examiner*—Andrew Faile
*Assistant Examiner*—Aung S. Moe
*Attorney, Agent, or Firm*—Nikaido, Marmelstein, Murray & Oram LLP

[57] ABSTRACT

The invention relates to an optical pickup device usable in television cameras,intended in particular for reading documents and comprising a pickup lens system. The optical device according to the invention comprises an aiming window, a selective mirror located substantially vertically above the window, dividing the optical beam from the said window into a transmitted beam and a reflected beam, and a reflecting mirror located in the continuation of the reflected beam from the selective mirror, directing the reflected beam towards the pickup lens system of the device.

7 Claims, 1 Drawing Sheet

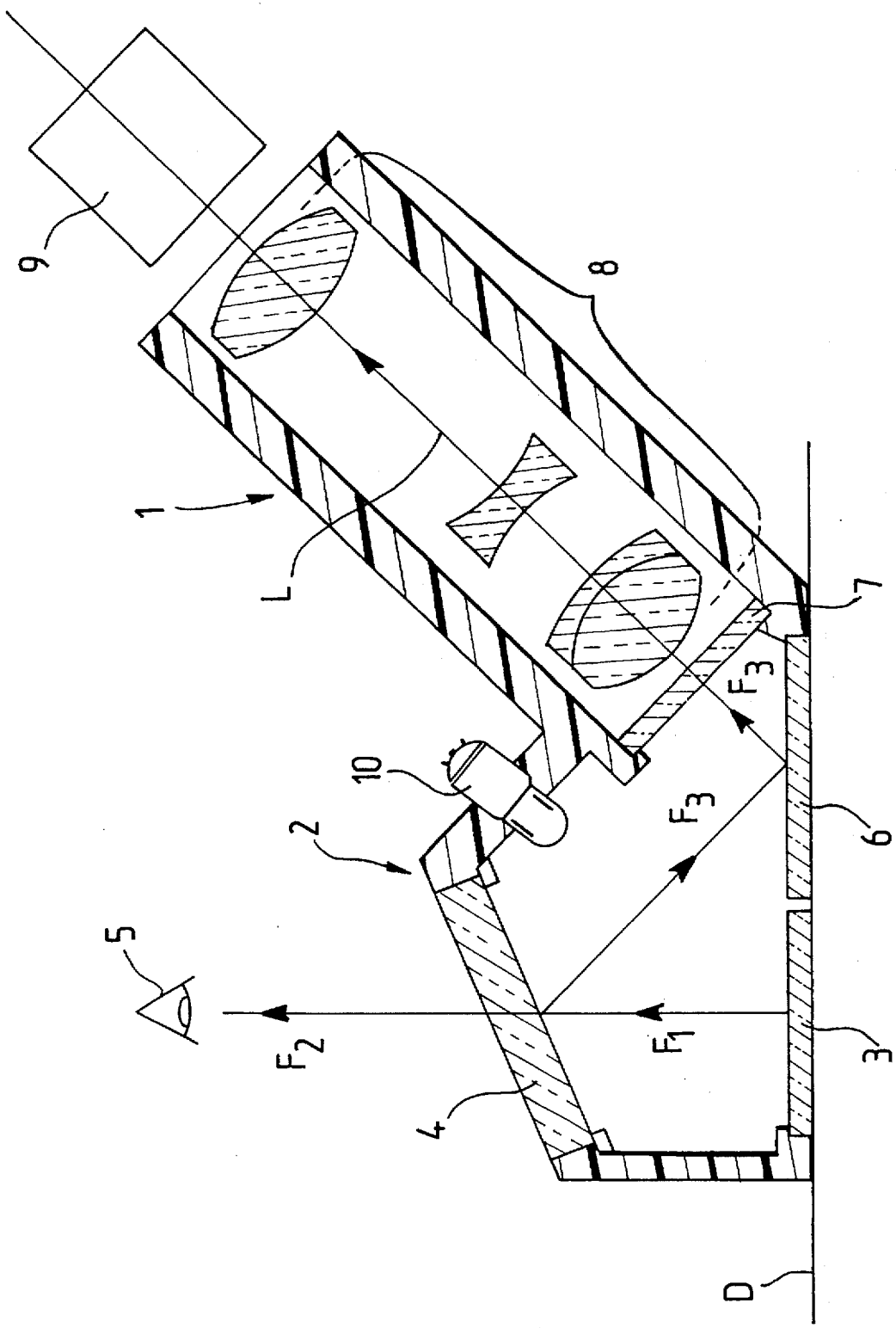

PICKUP DEVICE FOR READING PEN

BACKGROUND OF THE INVENTION

The present invention relates to optical pickup devices equipping, for example, hand-held miniature television cameras, after the fashion of a pen, these devices being particularly intended for reading documents.

In the present state of the art, there are known optical devices which form an image of the document viewed on the receiver of the camera, the optical axis of which is perpendicular to the said document, and the space whereof between the document and the first lens of the lens system is left transparent to enable the ambient light to illuminate the document, when it is not possible to illuminate it from behind.

It is also possible to cause the optical path to bend by interposing a mirror or a prism, these being placed in front of the lens system, so as to give the body of the camera an orientation, in relation to the plane of the document, which makes it easier to hold than in the vertical position.

However, in either case, there is a major drawback in that, with this type of hand-held pen camera, aiming is difficult and imprecise when the device has to be held vertically. Devices for aiming on the flat comprising a window type mouse, are known, but these necessitate a digitizing tablet, or a fairly large contact surface, which is not always available in the field, given the spatial constraints. This is a major drawback as it is necessary, in cartographical applications, for example, to aim at a very precise point on the document.

There are also known "scanner" type devices, for scanning on the flat or by hand, which enable a document to be stored in a computer memory; however, in this type of digitizing device, a precise point on the document can then only be aimed at on a screen, which makes it a lengthy process, with a device that is heavy and cumbersome.

SUMMARY OF THE INVENTION

The aim of the present invention is to overcome these drawbacks by making it possible, on one hand, for the optical head to be in flat contact with the document over a very small surface and, on the other hand, for the operator to aim accurately at the area that he or she is shooting.

To achieve this object, the invention provides an optical pickup device, usable in television cameras, designed in particular for reading documents, comprising a pickup lens system, characterized in that it includes:

an aiming window;

a selective mirror located substantially vertically in relation to the window, dividing the optical beam from the said window into a transmitted beam and a reflected beam;

a reflecting mirror located in the continuation of the reflected beam from the selective mirror, directing the reflected beam in the direction of the pickup lens system of the device.

The optical device according to the invention permits particularly accurate aiming, insofar as the observer lookes completely vertically down onto the point to be located.

He is then able to see the beam transmitted by the selective mirror and arriving from the aiming window disposed on the document.

The bending of the optical beam obtained using the selective and reflecting mirrors makes it possible, on one hand, to lengthen the optical path without increasing the overall dimensions of the device. It further enables the longitudinal axis of the camera to be inclined in relation to the plane of the documents, which makes the device very convenient to handle. The device is comfortably hand-held when the angle of inclination is between 25° and 65°, and preferably between 35° and 55°.

Separation of the optical beam at the selective mirror can be achieved in two different ways.

For instance, separation can be solely geometrical, and not spectral. In this case, the selective mirror is a semi-transparent strip which transmits, for example, 50% of they incident light and reflects the remainder thereof.

Separation can also be both geometrical and spectral. The selective mirror is then of the dichroic type and divides the incident beam into a transmitted beam and a reflected beam of different wavelengths. According to a variant of the invention, the transmitted beam is visible and the reflected beam is infrared.

The use of a dichroic mirror producing separation at 700 nm is particularly advantageous in the following case.

Maps are known which are composed of two images that are separate, although precisely superimposed on and adjusted to one another, one image being visible to the naked eye (and known as the map background), while the other is perceptible only in another spectrum (such as the near infrared) and represents a grid or an array of encoded dots to permit the location of useful geographical coordinates, such as longitude or latitude, thus enabling an operator aiming at a point on the map to determine its precise location. In the present state of the art, optical pickup devices do not, in fact, make this distinction.

The device according to the invention, equipped with a dichroic mirror providing separation at 700 nm, enables the camera to detect an infrared image superimposed on the image on the document that is visible to the naked eye. As absorption by this visible image of infrared radiation is practically nil, it is reflected by the document, the inks of which the image is composed being absorbent in the three fundamental colours of the visible spectrum, and not beyond. On this visible image is superimposed an encoded figure the printing ink of which absorbs infrared radiation and is non-absorbent in the visible radiation spectrum, hence not visible to the naked eye.

The optical device equipping the camera thus forms the infrared image on a detector, for example of the "Charge Coupled Device" (CCD) type, which is sensitive beyond the visible wavelengths, and removes therefrom the visible image which would impede the reading of the codes by the said CCD. For this purpose, it is advantageous to interpose, between the reflecting mirror and the pickup device, an infrared filter which removes the visible radiation.

BRIEF DESCRIPTION OF THE DRAWING

Further characteristics and advantages of the invention will emerge from the description of a particular form of embodiment, given hereinafter with reference to the sole FIGURE, which is a cross-sectional view of an optical device according to the invention.

DESCRIPTION OF THE PREFERRED EMBODIMENT

As can be seen from the single FIGURE, the optical device according to the invention is composed of a tubular body 1 extended by a closed chamber 2. The longitudinal axis L of the body forms an angle of approximately 45° with the lower face of the chamber, which is placed on the document D. This document is composed of two separate superimposed images, one of which is visible to the naked eye and the other of which is perceptible in the infrared spectrum.

In this lower face is mounted an aiming window 3 which is a disk of glass, treated to eliminate reflections and the dimensions of which depend on the surface area viewed. The window rests flat on the document to be examined.

A dichroic mirror 4 producing separation at 700 nm is disposed on the upper face of the chamber above window 3 and divides incident beam $F_1$, on one hand into a beam $F_2$ which passes through the mirror and is thus transmitted and visible and, on the other hand, into a reflected infrared beam $F_3$.

In this way, the observer 5, placed exactly vertically above window 3, can aim precisely at the point to be located.

Mirror 4 is further inclined in relation to the horizontal, in such a way as to send reflected beam $F_3$ in the direction of body 1. In order to redirect beam $F_3$, a reflecting mirror 6, for example aluminized, is disposed on the lower wall of the chamber, beside aiming window 3 and in the same plane.

The respective locations of dichroic mirror 4 and reflecting mirror 6 must enable the infrared beam $F_3$ to travel downstream of mirror 6 substantially parallel to the longitudinal axis L of body 1.

Infrared beam $F_3$, after passing through a protective infrared filter 7, travels through lens system 8 so as to form at camera 9 the image of the area observed via window 3, enlarged as required.

A lamp 10 is disposed in the upper wall of chamber 2 to illuminate the interior of the chamber and the object to be viewed. In the case of an object emitting visible and infrared radition, the lamp must itself emit a visible and an infrared flux.

The geometrical arrangement adopted enables dichroic mirror 4 to operate at a small angle of incidence, which has the effect of reducing the polarization phenomena associated with this type of multi-dielectric treatment and of maintaining its efficiency at a high level throughout the colour spectrum.

In the case of a document composed solely of an image visible to the naked eye, dichroic mirror 4 can be replaced by a semi-transparent strip geometrically separating two beams without spectral discrimination. The above-described device should then be converted by removing the infrared filter 7.

The invention is not limited to the particular type of optical head device described above, designed for a reading pen; on the contrary, numerous variants thereof could be produced, particularly as regards the angle of inclination, the object or image fields, focal distances or enlargements, spectra or the distance of the document.

I claim:

1. Optical pickup device, designed in particular for reading information contained in a given two-dimensional portion of a document comprising:

an aiming window;

pickup lens system designed to form an image of said two-dimensional portion on any light-detector associated with said optical pickup device and located behind said pickup lens system along its longitudinal axis;

a selective mirror located substantially vertically above said window, said selective mirror dividing an optical beam from said window into a transmitted beam and a reflected beam;

a reflecting mirror located in the continuation of the reflected beam from the selective mirror, directing said reflected beam in the direction of said pickup lens system of said device;

a tubular body oriented along a longitudinal axis and containing said pickup lens system;

a closed chamber which extends said tubular body, wherein a lower face of said closed chamber carries said aiming window and reflecting mirror in the same plane, and wherein an upper face of said chamber carries said selective mirror; and wherein said plane containing said aiming window and said reflecting mirror is parallel to a plane of the document.

2. Optical device according to claim 1, characterized in that the longitudinal axis (L) of the tubular body and of a camera for which it is intended is inclined in relation to the plane of the aiming window at an angle of 25° to 65°.

3. Optical device according to claim 1, characterized in that the selective mirror is a semi-transparent strip.

4. Optical device according to claim 1, characterized in that said selective mirror is of the dichroic type and divides said optical beam from said aiming window into two beams of different wavelengths.

5. Optical device according to claim 4, characterized in that the dichroic mirror divides said optical beam from said aiming window into a visible beam and an infrared beam.

6. Optical device according to claim 5, characterized in that an infrared filter is interposed between the reflecting mirror and the pickup lens system.

7. Optical device according to claim 1, characterized in that an illuminating lamp is disposed on an inside wall of the chamber to illuminate the interior thereof.

* * * * *